June 9, 1931.  C. J. FULCHER  1,809,029
TWINE CONTAINER
Filed March 24, 1930
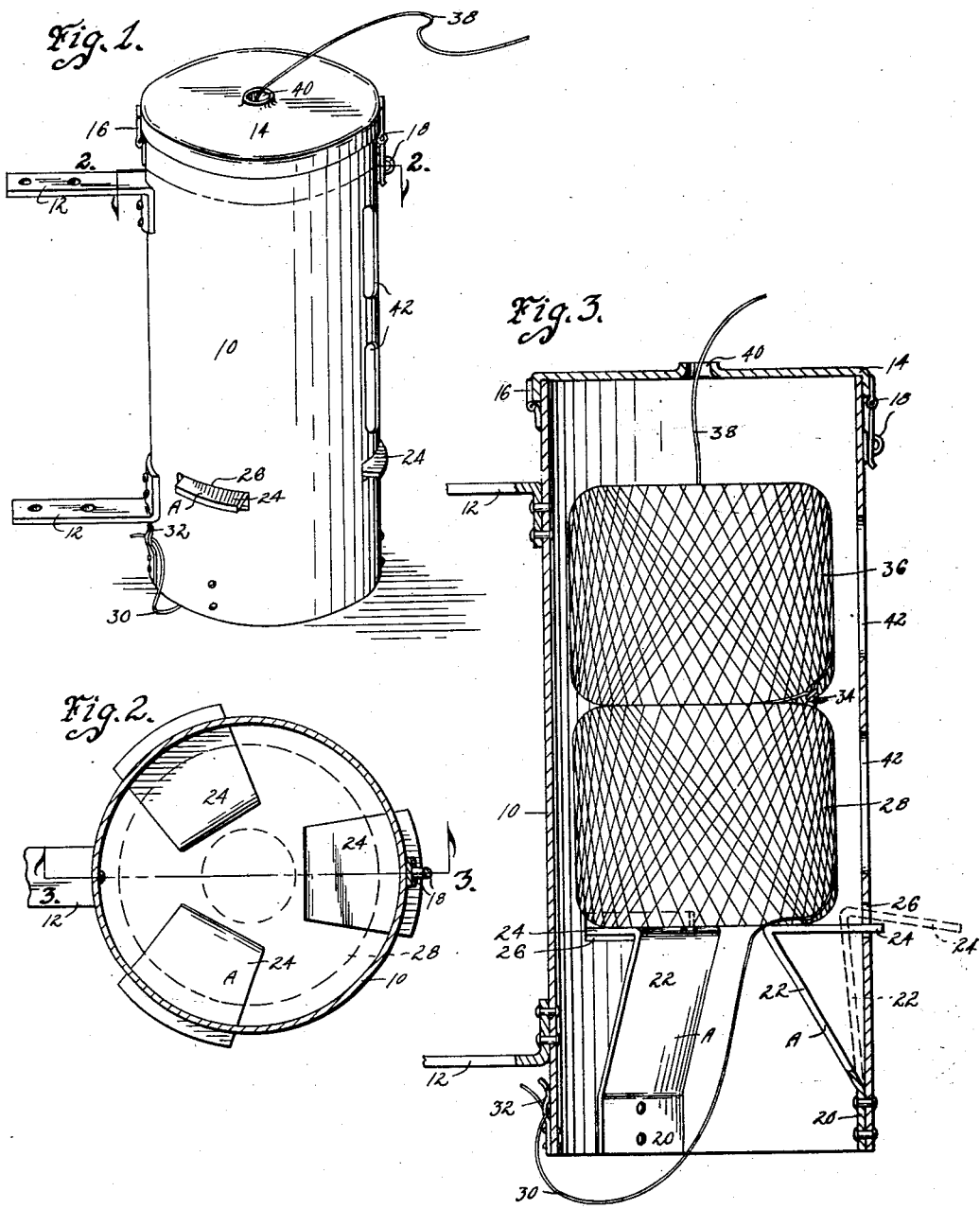
Inventor
~Carlton J. Fulcher~
by Bair, Freeman & Sinclair
Attorneys Patented June 9, 1931

1,809,029

UNITED STATES PATENT OFFICE

CARLTON J. FULCHER, OF EARLY, IOWA

TWINE CONTAINER

Application filed March 24, 1930. Serial No. 438,539.

The object of my invention is to provide a twine container which is simple, durable and comparatively inexpensive to manufacture.

A further object of my invention is to provide a twine container in which leaf spring members form a bottom, the members being arranged so that they can be moved by a ball of twine when such ball is inserted upwardly into the container. It may here be mentioned that twine containers for balls of twine, such as binding twine for grain binders, have been provided in the form of a receptacle deep enough to hold two or more balls of twine, and when one ball is partially gone and it is desirable to place another one in the container below the first ball, it is necessary to remove the first ball, tie the outer end of the twine to the inner end of the second ball and replace them in the container. There is danger during this operation of entangling the binding twine, and especially is this true if the first ball is nearly gone as in such condition it is merely a twine shell which may easily collapse and thus become entangled.

In an effort to overcome the objections to such a twine container I have provided a device which has movable members forming the bottom so that the second ball of twine may be tied to the first one and then inserted from below, pushing the first one upwardly as it is so inserted whereby all danger of entangling the twine is eliminated.

Another object is to provide a clip on the container to hold the outer end of the second ball so that when a third ball is inserted after the first one is gone this end of the twine may be easily disengaged from the clip and fastened to the third ball.

With these and other objects in view my invention consists in the construction, arrangement and combination of the various parts of my device, whereby the objects contemplated are attained, as hereinafter more fully set forth, pointed out in my claims, and illustrated in the accompanying drawings, in which:

Figure 1 is a perspective view of the twine container embodying my invention.

Figure 2 is a horizontal sectional view on the line 2—2 of Figure 1.

Figure 3 is a vertical sectional view on the line 3—3 of Figure 2.

On the accompanying drawings I have used the reference numeral 10 to indicate a tubular receptacle. The receptacle 10 may be provided with brackets 12 of any desired shape for attachment to a support such as the frame of a grain binder.

A cover 14 is provided for the receptacle 10 which may be hinged thereto as indicated at 16 if desired. At 18 a hasp is indicated for retaining the cover member 14 in closed position.

A bottom is provided for the receptacle 10 in the form of a plurality of leaf spring devices A. Each device A has a portion 20 secured to the receptacle 10 and an inwardly and upwardly extending portion 22 and an outwardly extending portion 24. A slot 26 in the container 10 is provided for each outwardly extending portion 24 of the leaves A.

The portions 24 of the leaves A provide a support for a ball of twine 28 as best shown in Figure 3 of the drawings. The outer end of the twine on the ball 28 is indicated at 30 and is illustrated as being held by a spring clip 32. The inner end of the twine of the ball 28 is tied as indicated at 34 to the outer end of the twine of a ball of twine 36. The inner end of the twine of the ball 36 is indicated at 38 and is illustrated as extending through an opening 40 of the cover member 14. The twine 38 extends to the binding mechanism of the binder or to any place where it is desirable to use it.

It will be obvious that after the first ball 36 is in position the second ball 28 may be inserted upwardly into the receptacle 10 by merely pushing it, which will flex the leaves A to the dotted line position shown at the right hand side of Figure 3. This will raise the first ball without disturbing it in any way and the leaves A will spring back into their supporting position as shown in full lines. Thus the second ball of twine may be conveniently connected with the first ball and inserted into the container without any danger of entangling the twine.

Sight openings 42 are provided whereby the balls of twine may be observed so that a new one can be inserted when one that is being used is partially dispensed.

Some changes may be made in the construction and arrangement of the parts of my device without departing from the real spirit and purpose of my invention, and it is my intention to cover by my claims, any modified forms of structure or use of mechanical equivalents, which may be reasonably included within their scope.

I claim as my invention:

1. In a twine container, a tubular receptacle and leaf spring members forming a bottom therefor, said members being capable of movement to a position allowing the insertion of a ball of twine through such bottom.

2. In a twine container, a tubular receptacle and movable members forming a bottom therefor, said members, when moved from normal position allowing the insertion of a ball of twine upwardly into said receptacle.

3. In a twine container, a tubular receptacle, movable members forming a bottom therefor for supporting a ball of twine, said members, when moved from normal position, allowing the insertion of another ball of twine below the first one.

4. In a twine container, a tubular receptacle, movable members forming a bottom therefor, said members, when moved from normal position, allowing the insertion of a ball of twine upwardly into said receptacle and a clip on said receptacle to retain an end of the twine on said ball.

5. In a twine container, a tubular receptacle, movable members forming a bottom therefor, said members, when moved from normal position allowing the insertion of a ball of twine upwardly into said receptacle and a sight opening in said receptacle.

6. In a twine container, a tubular receptacle and a leaf secured inside said receptacle adjacent the bottom thereof and extending upwardly and inwardly to serve as a support for a ball of twine, said leaf being capable of movement to a position allowing the insertion of a ball of twine upwardly into the container.

7. In a twine container, a tubular receptacle and a leaf secured inside said receptacle adjacent the bottom thereof and extending upwardly and inwardly then outwardly, a slot in the receptacle for the outwardly extending portion of the leaf to extend through, such portion being provided to serve as a support for a ball of twine, said leaf being capable of movement to a position allowing the insertion of a ball of twine upwardly into the container.

CARLTON J. FULCHER.